(12) United States Patent
Fukuda et al.

(10) Patent No.: US 9,086,517 B2
(45) Date of Patent: Jul. 21, 2015

(54) LIGHT FLUX CONTROLLING MEMBER, LIGHT EMITTING APPARATUS, SURFACE LIGHT SOURCE APPARATUS AND DISPLAY APPARATUS

(71) Applicant: Enplas Corporation, Kawaguchi-shi, Saitama (JP)

(72) Inventors: Yasuyuki Fukuda, Kawaguchi (JP); Masao Yamaguchi, Kawaguchi (JP)

(73) Assignee: ENPLAS Corporation, Saitama (JP)

( * ) Notice: Subject to any disclaimer, the term of this patent is extended or adjusted under 35 U.S.C. 154(b) by 225 days.

(21) Appl. No.: 13/665,030

(22) Filed: Oct. 31, 2012

(65) Prior Publication Data
US 2013/0107542 A1 May 2, 2013

(30) Foreign Application Priority Data
Oct. 31, 2011 (JP) .................. 2011-238570

(51) Int. Cl.
*F21V 5/04* (2006.01)
*G02B 3/00* (2006.01)
*G02B 19/00* (2006.01)
*G02F 1/1335* (2006.01)

(52) U.S. Cl.
CPC .......... *G02B 3/0056* (2013.01); *G02B 19/0014* (2013.01); *G02B 19/0061* (2013.01); *G02F 1/133603* (2013.01)

(58) Field of Classification Search
None
See application file for complete search history.

(56) References Cited

U.S. PATENT DOCUMENTS

| | | | | |
|---|---|---|---|---|
| 4,839,110 A | * | 6/1989 | Kingsbury | ............... 264/2.2 |
| 4,941,072 A | * | 7/1990 | Yasumoto et al. | ....... 362/249.06 |
| 6,055,111 A | * | 4/2000 | Nomura et al. | ............... 359/642 |
| 2010/0124055 A1 | * | 5/2010 | Munro et al. | ................. 362/231 |

FOREIGN PATENT DOCUMENTS

JP 2010-062456 A 3/2010

OTHER PUBLICATIONS

Machine translation of JP 2010-062456, published Mar. 18, 2010.*

* cited by examiner

*Primary Examiner* — Britt D Hanley
(74) *Attorney, Agent, or Firm* — Brundidge & Stanger, P.C.

(57) ABSTRACT

The present invention relates to light flux controlling member (140) formed by injection molding, light emitting apparatus (120) having light flux controlling member (140), surface light source apparatus (100) having light emitting apparatus (120), and a display apparatus having surface light source apparatus (100). Light flux controlling member (140) includes light control emission surface (141) configured to control light distribution of light emitted from light emitting element (130), and back face (142) opposite to light control emission surface (141). Light flux controlling member (140) is formed by injection molding by an overlap gate scheme, or by combination of the overlap gate scheme and a side gate scheme. Therefore, on back face (142) of light flux controlling member (140), there remains gate remnant (147) in such a manner to be in contact with an outer rim.

12 Claims, 10 Drawing Sheets

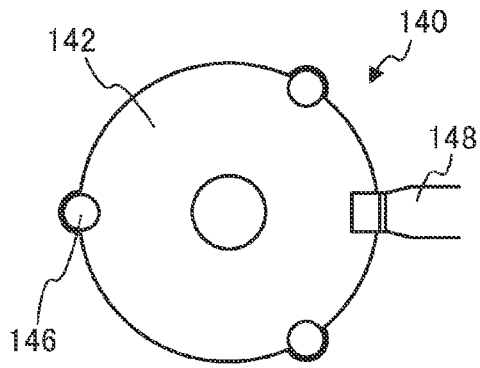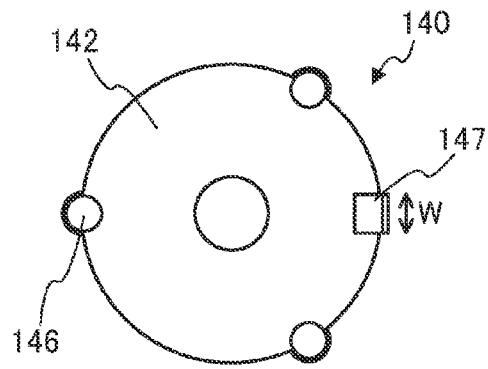
FIG.4A  FIG.4C
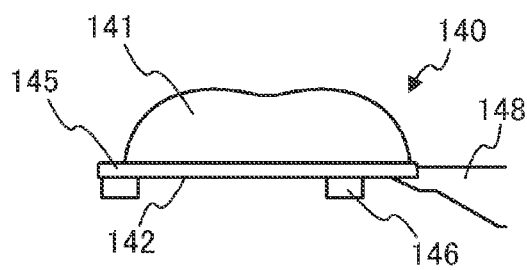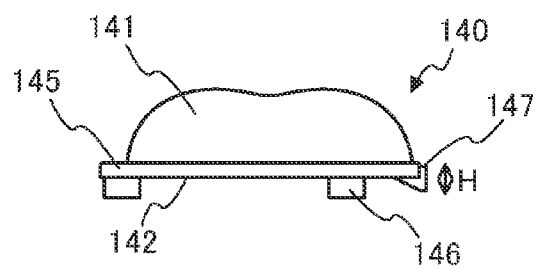
FIG.4B  FIG.4D

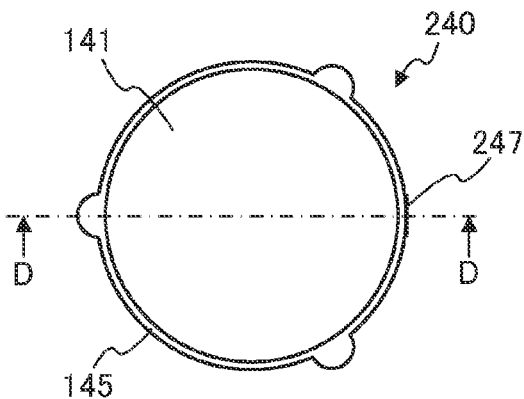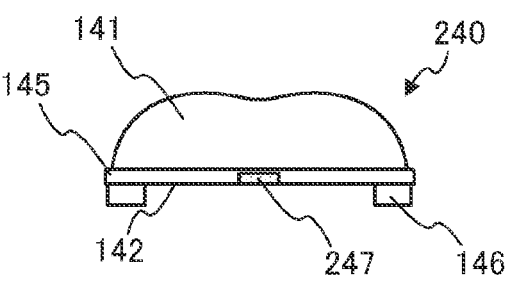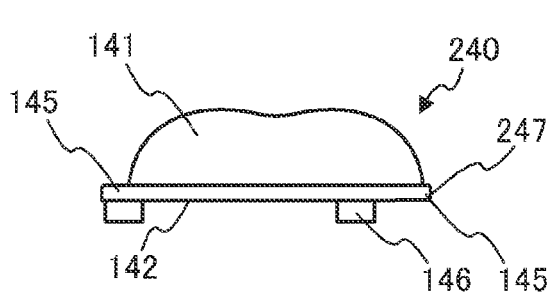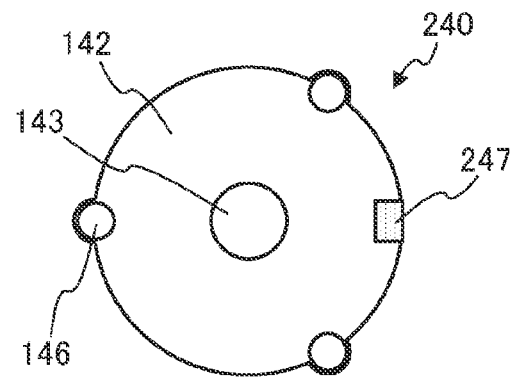
FIG.8A
FIG.8C
FIG.8B
FIG.8D
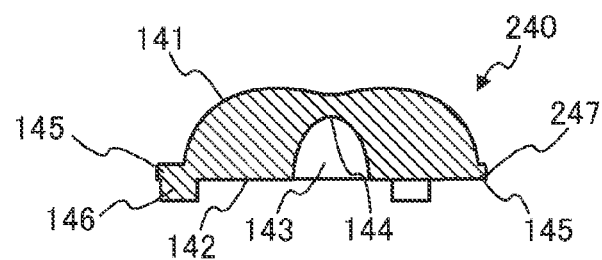
FIG.8E

LIGHT FLUX CONTROLLING MEMBER, LIGHT EMITTING APPARATUS, SURFACE LIGHT SOURCE APPARATUS AND DISPLAY APPARATUS

CROSS REFERENCE TO RELATED APPLICATION

This application is entitled and claims the benefit of Japanese Patent Application No. 2011-238570, filed on Oct. 31, 2011, the disclosure of which including the specification, drawings and abstract is incorporated herein by reference in its entirety.

TECHNICAL FIELD

The present invention relates to a light flux controlling member formed by injection molding and configured to control light distribution of light emitted from a light emitting element. Further, the present invention relates to a light emitting apparatus including the light flux controlling member, a surface light source apparatus including the light emitting apparatus, and a display apparatus including the surface light source apparatus.

BACKGROUND ART

Some transmission type image display apparatuses including liquid crystal display apparatuses use direct-type surface light source apparatuses as a backlight. In recent years, direct-type surface light source apparatuses having a plurality of light emitting diodes (LEDs) as a light source have come into use.

For example, a direct-type surface light source apparatus includes a substrate, a plurality of LEDs, a plurality of light flux controlling members (expanding lens) and a light diffusion member (diffusion panel). The plurality of LEDs are arranged in a matrix shape on the substrate. Above each LED, the light flux controlling member that expands light emitted from each LED in a surface direction of the substrate is arranged. The light emitted from the light flux controlling member is diffused by the light diffusion member, and illuminates an illumination target member (for example, a liquid crystal panel) in a planar shape.

Patent Literature 1 discloses manufacturing a light flux controlling member (expanding lens) used for a direct-type surface light source apparatus by injection molding using a transparent resin. Further, Patent Literature 1 discloses utilizing a gate protrusion (side gate) formed, by injection molding, on an outer peripheral part of an emission surface for positioning of the light flux controlling member.

CITATION LIST

Patent Literature

PTL 1
Japanese Patent Application Laid-Open No. 2010-62456

SUMMARY OF INVENTION

Technical Problem

As described in Patent Literature 1, when a gate remnant (a gate protrusion or a gate mark) exists on the outer peripheral part of the emission surface, light scatters on the gate remnant and the desired light distribution characteristics cannot be achieved. As means for overcoming the problem, it is possible to reduce the thickness of a gate (resin injection hole) of an injection molding die. However, it is not preferable to excessively reduce the thickness of the gate from the standpoint of moldability.

An object of the present invention is to provide a light flux controlling member that is formed by injection molding and maintains the thickness of a gate of an injection molding die, and in which the light distribution characteristics is less affected by a gate remnant. Another object of the present invention is to provide a light emitting apparatus including the light flux controlling member, a surface light source apparatus including the light emitting apparatus, and a display apparatus including the surface light source apparatus.

Solution to Problem

In order to achieve the above-described objectives, the light flux controlling member of the present invention is a light flux controlling member that is formed by injection molding and controls a traveling direction of light emitted from a light emitting element, and includes a light control emission surface configured to control the traveling direction of light emitted from the light emitting element; a back face opposite to the light control emission surface; and a gate remnant formed on a part of the back face so as to be in contact with an outer rim of the back face.

The light emitting apparatus of the present invention includes a light emitting element and the light flux controlling member according to the present invention, wherein the light flux controlling member is arranged so that a central axis of the light control emission surface coincides with an optical axis of the light emitting element.

The surface light source apparatus of the present invention includes the light emitting apparatus according to the present invention and a light diffusion member that transmits light from the light emitting apparatus while diffusing the light.

The display apparatus of the present invention includes the surface light source apparatus according to the present invention, and an illumination target member to be irradiated with light from the surface light source apparatus.

Advantageous Effects of Invention

The light flux controlling member of the present invention can be manufactured so as to maintain the thickness of the gate of the injection molding die, and less affect light distribution characteristics due to a gate remnant. Therefore, the light flux controlling member of the present invention can be easily manufactured, and exhibits superior light distribution characteristics.

Further, the light emitting apparatus of the present invention can effectively utilize the light control emission surface of the light flux controlling member according to the present invention to largely expand the light emitted from the light emitting element. Therefore, the surface light source apparatus of the present invention including a light emitting apparatus according to the present invention can uniformly illuminate a planar illumination target member even if the thickness of the surface light source apparatus is reduced. Therefore, it is also possible to reduce the thickness of the display apparatus of the present invention including the surface light source apparatus according to the present invention.

BRIEF DESCRIPTION OF DRAWINGS

FIGS. 4A-D are diagrams showing a structure of the light flux controlling member of Embodiment 1 before and after gate cutting;

FIGS. 8A-E are diagrams showing structures of a light flux controlling member of Embodiment 2;

DESCRIPTION OF EMBODIMENTS

Embodiments of the present invention will be explained in detail with reference to the drawings. In the following explanations, as representative examples of the surface light source apparatus of the present invention, surface light source apparatuses suitable for, for example, a backlight of a liquid crystal display apparatus will be explained. These surface light source apparatuses can be used as a display apparatus in combination with an illumination target member such as a liquid crystal panel.

Embodiment 1

Structure of Surface Light Source Apparatus and Light Emitting Apparatus

Figure 1:
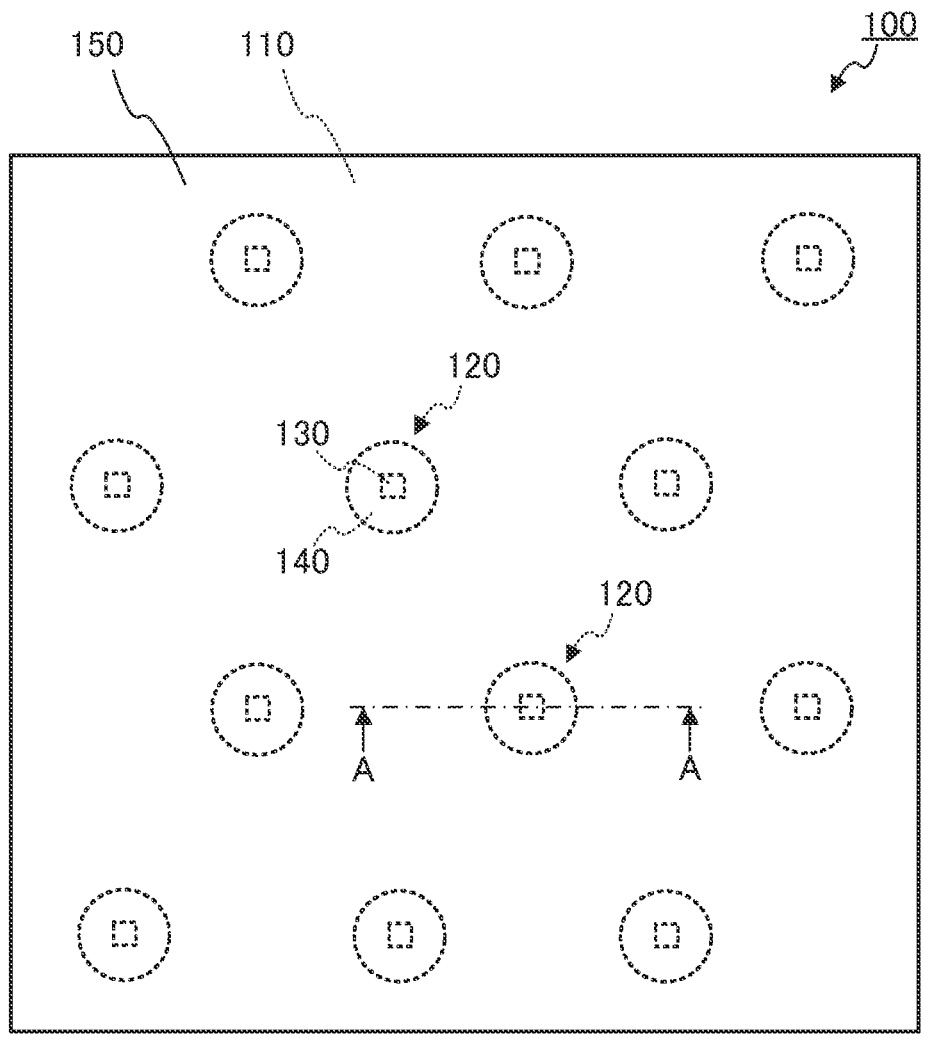
FIG. 1 is a plan view of a surface light source apparatus of Embodiment 1.

FIG. 1 is a plan view showing a structure of a surface light source apparatus of Embodiment 1 of the present invention.

Figure 2:
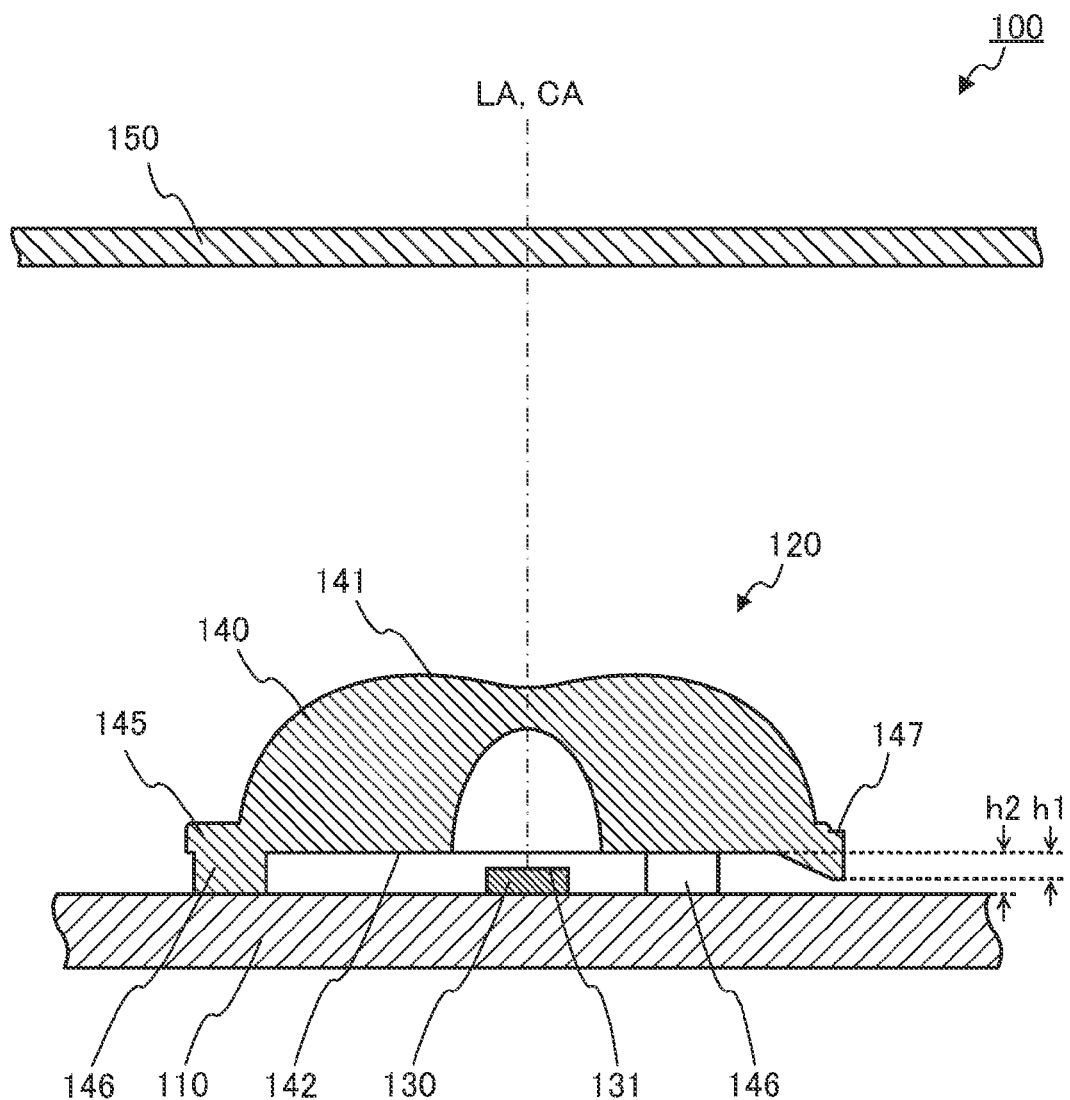
FIG. 2 is a cross-sectional view taken along line A-A shown in FIG. 1.

FIG. 2 is a cross-sectional view taken along line A-A shown in FIG. 1.

As shown in FIG. 1 and FIG. 2, surface light source apparatus 100 of Embodiment 1 includes substrate 110, a plurality of light emitting apparatuses 120, and light diffusion member 150.

The plurality of light emitting apparatuses 120 are arranged on substrate 110 in a predetermined arrangement and with a predetermined interval. Each of the plurality of light emitting apparatuses 120 has light emitting element 130 and light flux controlling member 140.

Light emitting element 130 is a light source of surface light source apparatus 100 (and light emitting apparatus 120), and fixed on substrate 110. Light emitting element 130 is a light emitting diode (LED), such as a white light emitting diode.

Light flux controlling member 140 is an expanding lens that controls light distribution of light emitted from light emitting element 130. Light flux controlling member 140 is arranged above light emitting element 130 so that central axis CA of light control emission surface 141 (stated below) coincides with optical axis LA of light emitting element 130. Further, between light emission surface 131 of light emitting element 130 and back face 142 of light flux controlling member 140, a gap is formed (see FIG. 2). The reasons for forming the gap include a positive reason: radiating heat emitted from light emitting element 130; and a negative reason: diminishing the effect of a position error on arranging light flux controlling member 140.

Light flux controlling member 140 is formed by injection molding. The material of light flux controlling member 140 is not specifically limited as long as it is a material that can be shaped by injection molding and that can transmit light of a desired wave length. For example, the material of light flux controlling member 140 is a light-transmissive resin including polymethylmethacrylate (PMMA), polycarbonate (PC) and an epoxy resin (EP).

Surface light source apparatus 100 of the present invention has a principal characteristic in the structure of light flux controlling member 140. Then, light flux controlling member 140 will be explained in detail separately.

Light diffusion member 150 is a plate-like member having light diffusion properties and transmits emission light from light flux controlling member 140 while diffusing the light. Normally, light diffusion member 150 has substantially the same size as an illumination target member such as a liquid crystal panel. For example, light diffusion member 150 is formed of light-transmissive resin including polymethylmethacrylate (PMMA), polycarbonate (PC), polystyrene (PS) and styrene-methyl methacrylate copolymer resin (MS). In order to impart light diffusion properties, fine irregularities are formed on the surface of light diffusion member 150, or light diffusion elements such as beads are dispersed inside light diffusion member 150.

In surface light source apparatus 100 of the present invention, light emitted from each light emitting element 130 is expanded in the surface direction of substrate 110 by light flux controlling member 140, and further diffused by light diffusion member 150. As a result, surface light source apparatus 100 of the present invention can uniformly illuminate the planar illumination target member (for example, a liquid crystal panel).

Structure of Light Flux Controlling Member

Figures 3A, 3C:
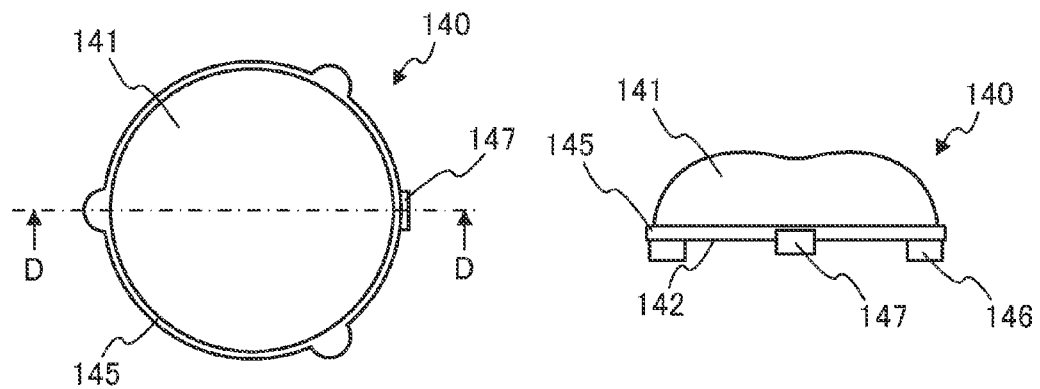
FIGS. 3A-E are diagrams showing a structure of the light flux controlling member of Embodiment 1.
Figures 3B, 3D:
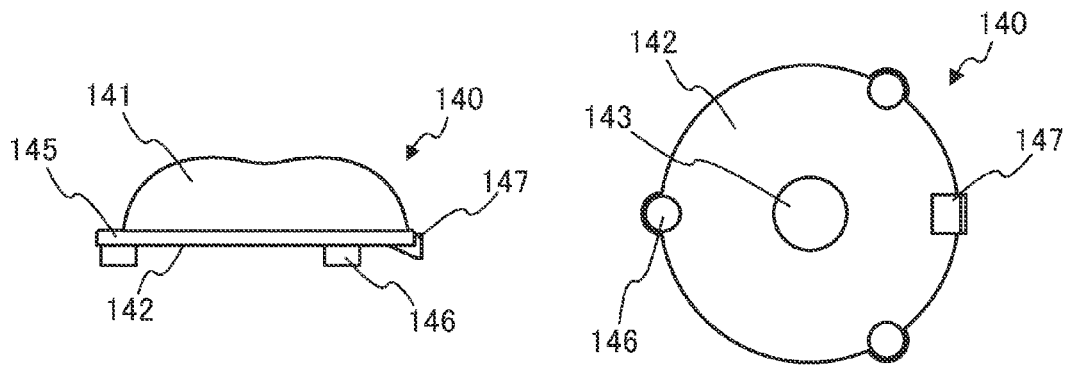
Figure 3E:
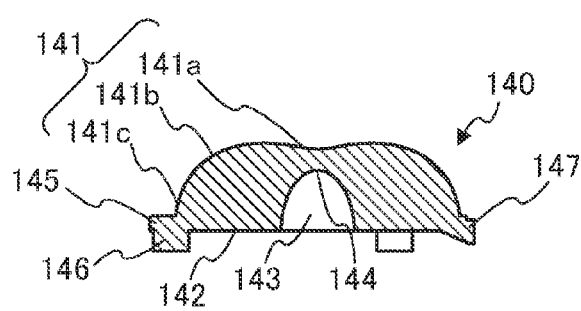

FIG. 3 is a diagram showing a structure of light flux controlling member 140 of Embodiment 1. FIG. 3A is a plan view of light flux controlling member 140. FIG. 3B is a front view of light flux controlling member 140. FIG. 3C is a side-view of light flux controlling member 140. FIG. 3D is a bottom view of light flux controlling member 140. Further, FIG. 3E is a cross-sectional view taken by line D-D shown in FIG. 3A.

As shown in FIGS. 3A-3E, light flux controlling member 140 has light control emission surface 141, back face 142, concave part 143, flange 145 and a plurality of leg portions 146.

Light control emission surface 141 controls a traveling direction of light that has been emitted from light emitting element 130 and entered the inside of light flux controlling member 140. Light control emission surface 141 is a rotationally symmetric surface about central axis CA as the axis (see FIG. 2), and projecting from flange 145 to the upper side (the side of light diffusion member 150).

Light control emission surface 141 includes first emission surface 141a positioned within a predetermined range centered on central axis CA of light control emission surface 141, second emission surface 141b formed continuously around first emission surface 141a, and third emission surface 141c that connects second emission surface 141b with flange 145 (see FIG. 3E). First emission surface 141a is a smooth curved surface that is convex downward (toward the side of light emitting element 130). The shape of first emission surface 141a is a concave shape that is like a cut-off part of a spherical shape. Second emission surface 141b is a smooth curved surface that is convex upward (toward the side of light diffusion member 150) positioned in the periphery of first emission surface 141a. The shape of second emission surface 141b is such a convex shape that is obtained by cutting a part of a torus. Third emission surface 141c is a curved surface positioned in the periphery of second emission surface 141b. In the cross-section shown in FIG. 3E, the cross-section of third emission surface 141c may be a linear shape or may be a curved shape.

Concave part 143 is formed in the center part of the lower side (the side of light emitting element 130) of light flux controlling member 140. Internal face 144 of concave part 143 allows the light emitted within the predetermined angle with respect to optical axis LA of light emitting element 130 (main beam) of the light emitted from light emitting element 130 to enter the inside of light flux controlling member 140. Back face 142 is a plane opposite to light control emission surface 141 and expanding radially from the aperture rim part of concave part 143. Back face 142 allows the light other than the main beam (sub-beam) of the light emitted from light emitting element 130 to enter the inside of light flux controlling member 140.

Flange 145 is positioned between the outer peripheral part of light control emission surface 141 and the outer peripheral part of back face 142, and projects in a radially outward direction. The shape of flange 145 is a substantially annular shape. Although flange 145 is not necessarily required, the provision of flange 145 makes it easy to handle and align light flux controlling member 140. The thickness of flange 145 is not specifically limited, and determined in consideration of the area necessary for light control emission surface 141 and the moldability of flange 145. For example, the thickness of flange 145 is approximately 0.8 mm.

The plurality of leg portions 146 are cylindrical members provided on the outer peripheral part of back face 142 and projecting from back face 142 downward (toward light emitting element 130). The plurality of leg portions 146 support light flux controlling member 140 in an appropriate position relative to light emitting element 130. Although not specifically limited, the height of leg portion 146 is, for example, approximately 1 mm.

Here, principal characteristics of the present invention are explained. The light flux controlling member of the present invention is formed by injection molding. Therefore, in the light flux controlling member of the present invention, gate remnants (resin injection remains) according to the gate schemes are formed. As used herein, the term "gate remnant" encompasses a gate protrusion and a gate mark. The "gate protrusion" refers to a remaining part after removing a part of a gate part. Further, the "gate mark" refers to a cut portion after removing a gate part entirely. Gate schemes in injection molding include various schemes such as a direct gate scheme, a side gate scheme and a pin gate scheme. However, one feature of the light flux controlling member of the present invention is that the controlling member is formed by an overlap gate scheme or a combination of the overlap gate scheme and the side gate scheme. The "overlap gate scheme" refers to a scheme in which the gate part is connected to (overlaps on) the back face of the light flux controlling member. Further, the "side gate scheme" refers to a scheme in which the gate part is connected to the side face of the light flux controlling member. Therefore, in the light flux controlling member of the present invention, there exists a gate remnant (a gate protrusion or a gate mark) at least on the back face. The advantageous effect that can be obtained by adopting the overlap gate scheme will be stated below.

FIG. 4A is a bottom view of light flux controlling member 140 of Embodiment 1 before gate cutting. FIG. 4B is a front view of light flux controlling member 140 before gate cutting. Further, FIG. 4C is a bottom view of light flux controlling member 140 after gate cutting, and FIG. 4D is a front view of light flux controlling member 140 after gate cutting. FIG. 4C is the same drawing as FIG. 3D, and FIG. 4D is the same drawing as FIG. 3B.

Figure 5A:
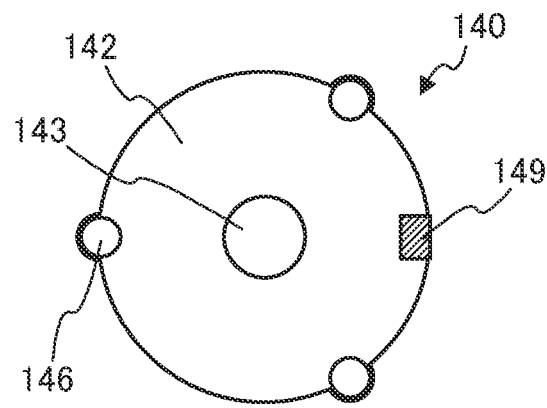
FIGS. 5A and B are diagrams showing the position of a resin injection area of the light flux controlling member of Embodiment 1.
Figure 5B:
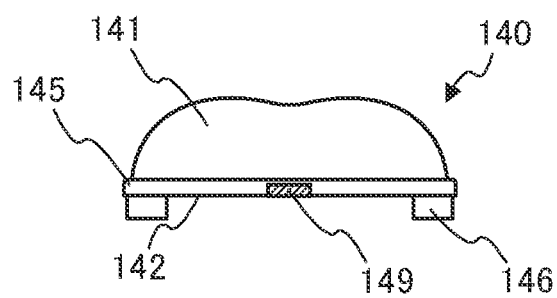

FIG. 5A is a bottom view showing the position of resin injection area 149 of light flux controlling member 140 of Embodiment 1. FIG. 5B is a side-view showing the position of resin injection area 149 of light flux controlling member 140 of Embodiment 1. Resin injection area 149 refers to a connecting area of gate part 148 (gate protrusion 147) to the body part of light flux controlling member 140. Resin injection area 149 corresponds to a resin injection hole of a cavity part of an injection molding die. In FIG. 5A and FIG. 5B, gate protrusion 147 is omitted.

As shown in FIG. 4A and FIG. 4B, light flux controlling member 140 of Embodiment 1 is formed by combination of the overlap gate scheme and the side gate scheme. Therefore, gate part 148, as shown in FIG. 5A and FIG. 5B, is connected to a part of back face 142 of light flux controlling member 140 and a part of the side face of flange 145. By cutting gate part 148, gate protrusion 147 that is the gate remnant is formed.

As shown in FIG. 4C and FIG. 5A, gate protrusion 147 is connected to a part of the outer circumference part of back face 142 (an area contacting with the outer rim of back face 142). Further, as shown in FIG. 4D and FIG. 5B, gate protrusion 147 is connected also to a part of the side face of flange 145 (an area adjoining to back face 142).

Where light flux controlling member 140 is formed by the overlap gate scheme, resin injection area 149 contacts with the outer rim of back face 142. On the contrary, where light flux controlling member 140 is formed by the pin gate scheme, resin injection area 149 does not contact with the outer rim of back face 142. Where light flux controlling member 140 is formed by the pin gate scheme, the product (light flux controlling member 140) is separated from gate part 148 simultaneously with the opening of the dies. On the contrary, where light flux controlling member 140 is formed by the overlap gate scheme, it is difficult to cut the gate part so that gate part 148 does not remain. Therefore, it is often that gate protrusion 147 is formed.

Further, in light flux controlling member 140 of Embodiment 1, the shape of gate protrusion 147 connecting to back face 142 is substantially a triangular prism. In other words, among the faces constituting gate protrusion 147, the face opposed to resin injection area 149 of back face 142 is inclined against back face 142. This means that the direction of flow of the resin in a gate on injection molding is oblique to the resin injection hole on the back face. By this configuration, it is possible to improve resin fluidity on injection molding by effectively utilizing the flow pressure of the resin. On the other hand, in the pin gate scheme, the direction of flow of the resin in a gate before the resin injection hole on injection molding is perpendicular to the surface on which the resin injection hole is formed.

In this way, by the shape and position, etc. of the gate remnant, it is possible to confirm which of the overlap gate scheme and the pin gate scheme is adopted.

The width and the height of gate protrusion 147 (one end of gate part 148), are determined in consideration of the moldability. For example, the width of gate protrusion 147 (W in FIG. 4C) is approximately 2 mm, and the height (H in FIG. 4D) of the gate protrusion is approximately 1.2 mm.

As shown in FIG. 2, height h1 of gate protrusion 147 from back face 142 to the lower side (the side of light emitting element 130) is lower than height h2 of leg portion 146 from back face 142 to the lower side. Where height h1 of gate protrusion 147 is equal to or greater than height h2 of leg portion 146, gate protrusion 147 interferes with substrate 110 when light flux controlling member 140 is arranged on substrate 110. From standpoint of more certainly preventing the interference, it is preferable that height h1 of gate protrusion 147 is lower than height h2 of leg portion 146 by 0.2 mm or greater.

Figure 6A:
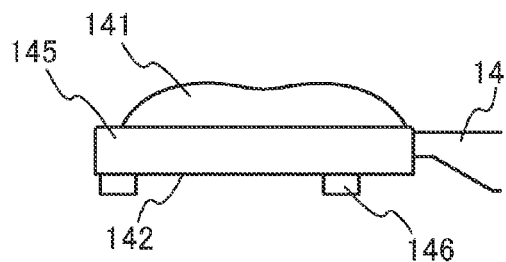
FIGS. 6A-H are diagrams showing examples of connecting positions of a gate part to the light flux controlling member.
Figure 6B:
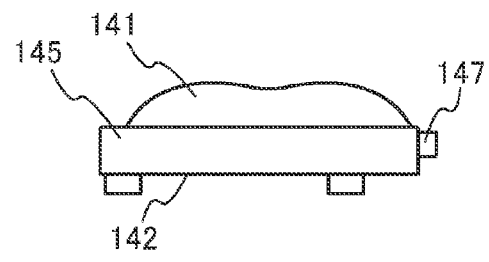
Figure 6C:
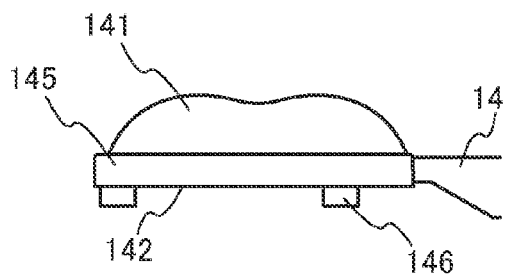
Figure 6D:
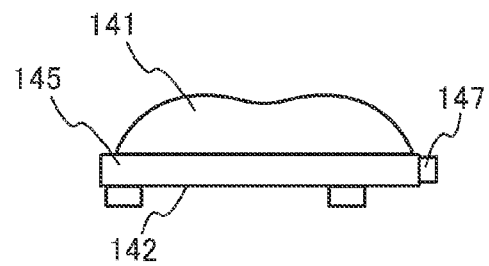
Figure 6E:
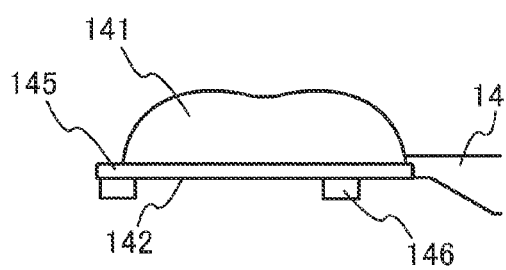
Figure 6F:
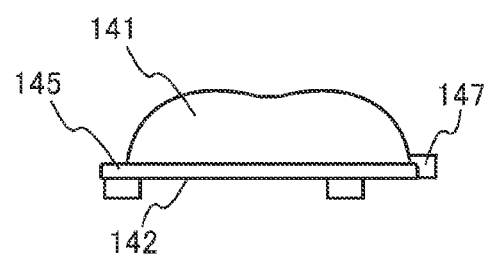
Figure 6G:
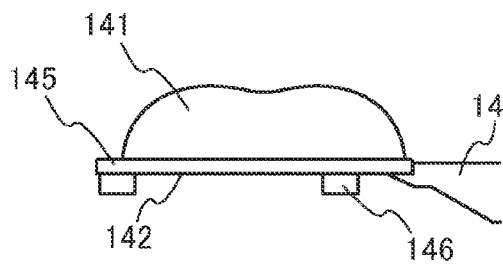
Figure 6H:
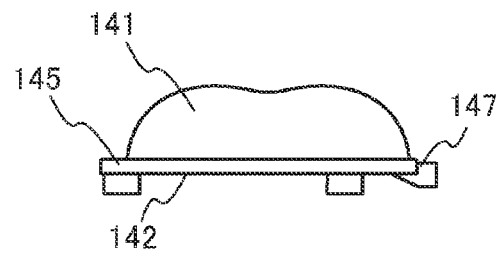

FIG. 6A is a front view of a conventional light flux controlling member (first example) before gate cutting, and FIG. 6B is a front view of the conventional light flux controlling member (first example) after gate cutting. FIG. 6C is a front view of a conventional light flux controlling member (second example) before gate cutting, and FIG. 6D is a front view of the conventional light flux controlling member (second example) after gate cutting. FIG. 6E is a front view of a conventional light flux controlling member (third example) before gate cutting, and FIG. 6F is a front view of the conventional light flux controlling member (third example) after gate cutting. FIG. 6G is a front view of light flux controlling member 140 of Embodiment 1 before gate cutting, and FIG. 6H is a front view of light flux controlling member 140 of Embodiment 1 after gate cutting. FIG. 6G is the same drawing as FIG. 4B, and FIG. 6H is the same drawing as FIG. 4D.

As shown in FIG. 6A and FIG. 6B, the conventional light flux controlling member has a large thickness of flange 145. Therefore, the conventional light flux controlling member is formed so that gate part 148 is connected to the side face of flange 145. However, in recent years, there arises demand to increase the area of light control emission surface 141 in order to emit more light in a controlled manner out of the light captured from the light emitting element within the light flux controlling member. Therefore, as shown in FIG. 6C and FIG. 6D, as well as FIG. 6E and FIG. 6F, the area of light control emission surface 141 has come to be increased by reducing the thickness of flange 145.

As shown in FIG. 6C and FIG. 6D, where the thickness of flange 145 is a certain thickness or greater, it becomes possible to form a light flux controlling member with gate part 148 being connected only to the side face of flange 145. However, as shown in FIG. 6E and FIG. 6F, where the thickness of flange 145 is less than a certain thickness, the thickness of gate part 148 exceeds the thickness of flange 145. As means for overcoming the problem, thinning the thickness of gate part 148 is considered to be proper. However, gate part 148 needs to have a certain level of thickness from the standpoint of moldability. Therefore, those conventional light flux controlling members in which the thickness of flange 145 is small have been formed so that gate part 148 also connects to the outer peripheral part of light control emission surface 141.

On the other hand, as shown in FIG. 6G and FIG. 6H, in light flux controlling member 140 of Embodiment 1, instead of connecting gate part 148 to light control emission surface 141, it is connected to back face 142. In other words, while maintaining the thickness of gate part 148, the connecting position of gate part 148 is moved to the lower side (the side of light emitting element 130).

Advantageous Effect

Figure 7A:
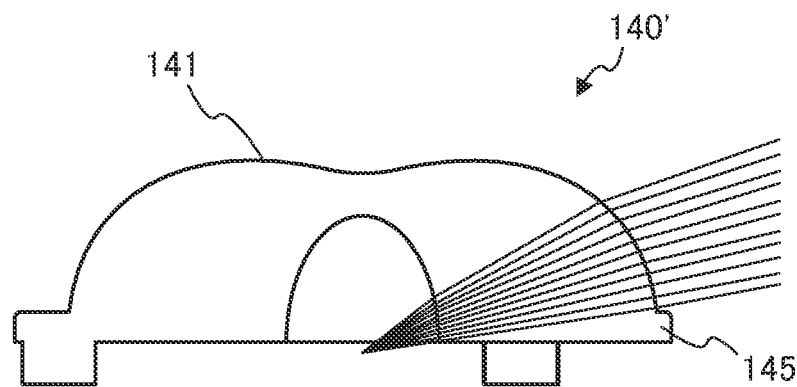
FIGS. 7A-C are cross-sectional views showing one example of an optical path of the light flux controlling member.

FIG. 7A is a cross-sectional view showing one exemplary optical path of light flux controlling member 140' formed by a production method in which no gate remnant is produced (for example, by machining). As shown in this drawing, light flux controlling member 140' that does not have any gate remnant can control the direction of light emitted from light emitting element 130 by using the whole surface of light control emission surface 141. However, from the standpoint of the manufacturing cost, it is preferable to manufacture the light flux controlling member by injection molding rather than the process of machining, etc.

Figure 7B:
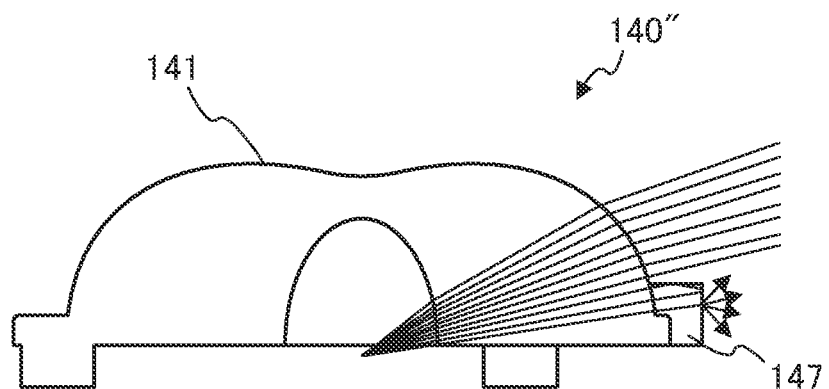

FIG. 7B is a cross-sectional view showing one exemplary optical path of conventional light flux controlling member 140" formed by injection molding (see FIG. 6F). As shown in this drawing, in conventional light flux controlling member 140", a gate remnant (gate protrusion 147) has been formed also in a part of light control emission surface 141. In such cases, as shown in FIG. 7B, a part of light emitted from light emitting element 130 is reflected to an unintended direction in the gate remnant (gate protrusion 147), and it is not possible to achieve the desired light distribution. In other words, as compared to light flux controlling member 140' in FIG. 7A, a light volume that is controllable by light flux controlling member 140" is small.

Figure 7C:
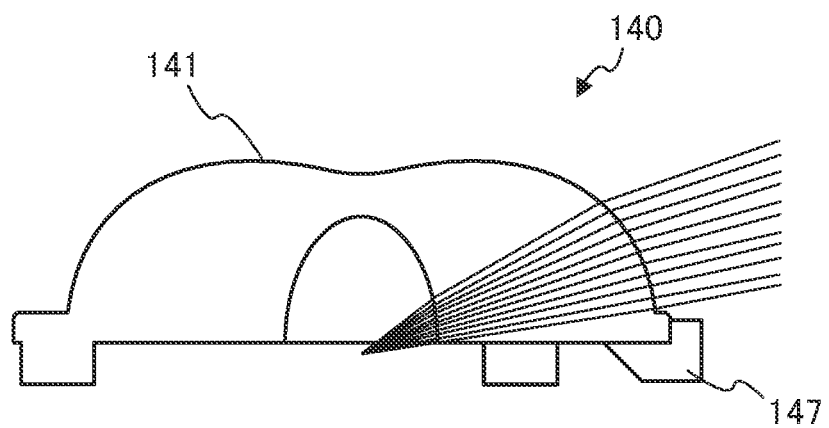

On the other hand, FIG. 7C is a cross-sectional view showing one exemplary optical path of light flux controlling member 140 of Embodiment 1 formed by injection molding. As shown in this drawing, in light flux controlling member 140 of Embodiment 1, the gate remnant (gate protrusion 147) is not formed on light control emission surface 141. Therefore, in the same way as light flux controlling member 140' formed by machining (see FIG. 7A), light flux controlling member 140 of Embodiment 1 can control the direction of light emitted from light emitting element 130 by using the whole surface of light control emission surface 141.

In this way, in light flux controlling member 140 of the present embodiment, the thickness of the gate of the injection molding die is maintained, and the light distribution characteristics is less affected by the gate remnant. Therefore, light flux controlling member 140 of the present embodiment can be easily manufactured, and has superior light distribution characteristics.

Further, light flux controlling member 140 of the present embodiment can effectively utilize also the outer peripheral part of light control emission surface 141 to effectively expand the light emitted from light emitting element 130. Therefore, surface light source apparatus 100 including light flux controlling member 140 of the present embodiment can uniformly illuminate the planar illumination target member even if the thickness of surface light source apparatus 100 is reduced.

Embodiment 2

Structure of Surface Light Source Apparatus and Light Emitting Apparatus

The surface light source apparatus and the light emitting apparatus of Embodiment 2 of the present invention are different from surface light source apparatus 100 and light emitting apparatus 120 of Embodiment 1 as shown in FIG. 1 and FIG. 2 in that they have light flux controlling member 240 of Embodiment 2 instead of light flux controlling member 140 of Embodiment 1. Then, in the present embodiment, only light flux controlling member 240 of Embodiment 2 is explained.

Structure of Light Flux Controlling Member

FIG. 8 is a diagram showing a structure of light flux controlling member 240 of Embodiment 2. FIG. 8A is a plan view of light flux controlling member 240 of Embodiment 2. FIG. 8B is a front view of light flux controlling member 240. FIG. 8C is a side-view of light flux controlling member 240. FIG. 8D is a bottom view of light flux controlling member 240. Further, FIG. 8E is a cross-sectional view taken by line D-D shown in FIG. 8A. Parts that are identical with ones of light flux controlling member 140 in Embodiment 1 shown in FIGS. 3A-3E will be assigned the same reference numerals without further explanations.

As shown in FIGS. 8A-8E, light flux controlling member 240 of Embodiment 2 has light control emission surface 141, back face 142, concave part 143, flange 145 and a plurality of leg portions 146. In light flux controlling member 240 of Embodiment 2, the gate part is cut so as not to cause any gate protrusion. Therefore, in light flux controlling member 240 of Embodiment 2, as shown in FIG. 8C and FIG. 8D, gate mark 247 that is a gate remnant is formed on a part of the outer peripheral part of back face 142 and a part of the side face of flange 145.

Advantageous Effect

Light flux controlling member 240 of Embodiment 2 has the same advantageous effect as light flux controlling member 140 of Embodiment 1.

Embodiment 3

Structure of Surface Light Source Apparatus and Light Emitting Apparatus

Figure 9:
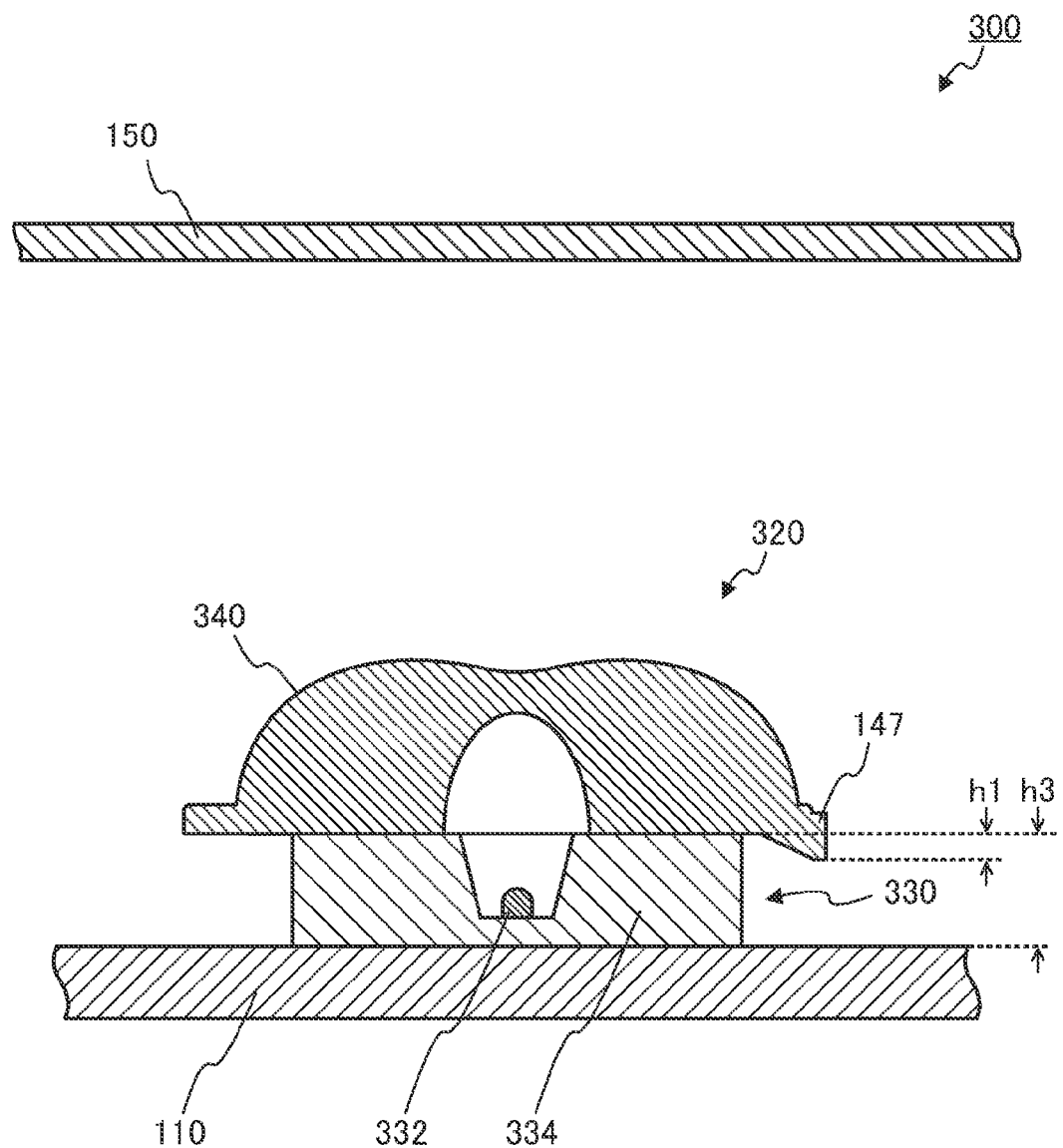
FIG. 9 is a partially enlarged cross-sectional view of a surface light source apparatus of Embodiment 3.
Figure 10A:
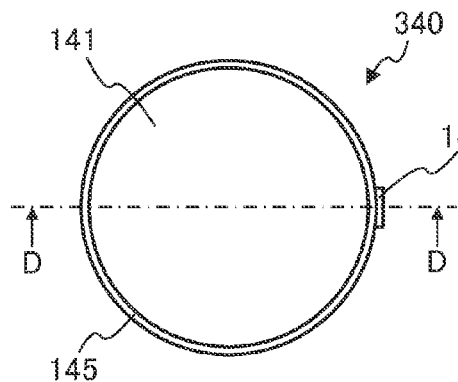
FIGS. 10A-E are diagrams showing structures of the light flux controlling member of Embodiment 3.
Figure 10C:
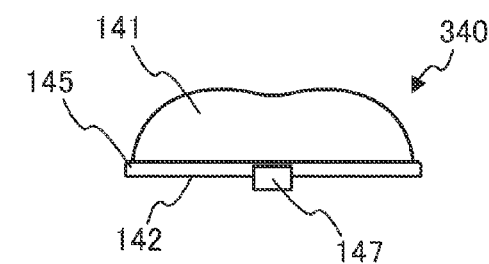
Figure 10B:
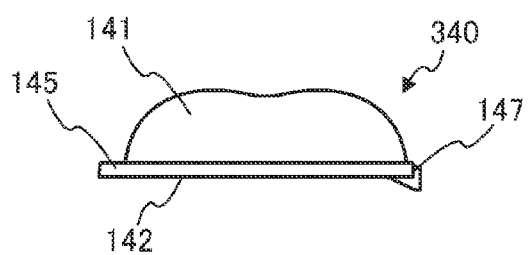
Figure 10D:
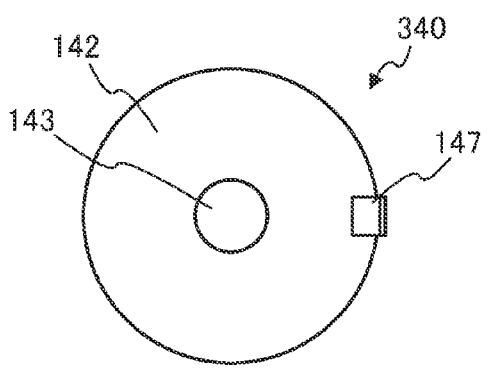
Figure 10E:
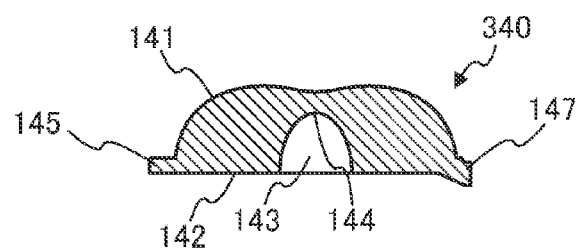

FIG. 9 is a partially enlarged cross-sectional view showing the structure of the surface light source apparatus of Embodiment 3 of the present invention (corresponding to FIG. 2). As shown in FIG. 9, surface light source apparatus 300 of Embodiment 3 includes substrate 110, a plurality of light emitting apparatuses 320, and light diffusion member 150. Parts that are identical with ones of surface light source apparatus 100 in Embodiment 1 shown in FIGS. 1 and 2 will be assigned the same reference numerals without further explanations.

Each of the plurality of light emitting apparatuses 320 includes light emitting element package 330 and light flux controlling member 340. Light emitting element package 330 includes light emitting element 332 and holder 334.

Light emitting element 332 is a light source of surface light source apparatus 300 (and light emitting apparatus 320), and arranged in the concave part of holder 334. Light emitting element 332 is, for example, a light emitting diode (LED), such as a white light emitting diode.

Holder 334 has a concave part having a substantially circular truncated cone shape coated by a reflector. On the bottom face of the concave part, light emitting element 332 is arranged. As shown in FIG. 9, on the upper part of holder 334, light flux controlling member 340 is arranged. In other words, holder 334 also operates as a supporting member for light flux controlling member 340.

Structure of Light Flux Controlling Member

FIG. 10 is a diagram showing the structure of light flux controlling member 340 of Embodiment 3. FIG. 10A is a plan view of light flux controlling member 340. FIG. 10B is a front view of light flux controlling member 340. FIG. 10C is a side-view of light flux controlling member 340. FIG. 10D is a bottom view of light flux controlling member 340. Further, FIG. 10E is a cross-sectional view taken by line D-D shown in FIG. 10A. Parts that are identical with ones of light flux controlling member 140 in Embodiment 1 shown in FIGS. 3A-3D will be assigned the same reference numerals without further explanations.

As shown in FIGS. 10A-10E, light flux controlling member 340 of Embodiment 3 has light control emission surface 141, back face 142, concave part 143 and flange 145. Since light flux controlling member 340 of Embodiment 3 is supported by holder 334, unlike light flux controlling member 140 of Embodiment 1 shown in FIGS. 3A-3D, it does not have the leg portion. In this case, as shown in FIG. 9, height h1 of gate protrusion 147 from back face 142 to the lower side (the side of light emitting element 332) is not specifically limited as long as it is lower than height h3 of holder 334.

Advantageous Effect

Light flux controlling member 340 of Embodiment 3 has an advantageous effect that is the same as light flux controlling member 140 of Embodiment 1.

In each of the above-described embodiments, a light flux controlling member (expanding lens) that expands the light emitted from the light emitting element has been explained. However, the light flux controlling member of the present invention is not limited thereto. For example, the light flux controlling member of the present invention may be a condenser lens that concentrates the light emitted from the light emitting element.

Further, although in each of the above-described embodiments, an example has been explained in which the light flux controlling member of the present invention is formed by combination of the overlap gate scheme and the side gate scheme, the light flux controlling member of the present invention may be formed only by the overlap gate scheme. In this case, the gate remnant is formed only on a part of the back face so as to be in contact with the outer rim of the back face.

Further, although in each of the above-described embodiments, a light flux controlling member of the present invention having a flange has been explained, the light flux controlling member of the present invention may omit to have the flange. Where the light flux controlling member of the present invention that does not have a flange is formed by combination of the overlap gate scheme and the side gate scheme, the gate remnant is formed on a part of the back face and a part of the light control emission surface adjoining to the part of the back face.

Further, although in each of the above-described embodiments, examples has been explained in which the width of the flange in a plan view is constant around the complete periphery of the light flux controlling member, the shape of the flange is not limited thereto. For example, by reducing the width of the flange only in a position on which the gate is formed, the flange may be formed into D-cut shape. In this way, by reducing the width of the flange in the part on which the gate is formed, it becomes possible to make the size of the light flux controlling member after gate cutting smaller than the case where the flange having the constant width is formed around the complete periphery of the light flux controlling member.

INDUSTRIAL APPLICABILITY

The light flux controlling member, the light emitting apparatus and surface light source apparatus of the present invention, for example, can be applied to the backlight of the liquid crystal display apparatus and general lighting, etc.

REFERENCE SIGNS LIST 100, 300 surface light source apparatus
110 substrate
120, 320 light emitting apparatus
130, 332 light emitting element
131 light emission surface 140, 240, 340 light flux controlling member
141 light control emission surface
141a first emission surface
141b second emission surface
141c third emission surface
142 back face
143 concave part
144 internal face of concave part
145 flange
146 leg portion
147 gate protrusion
148 gate part
149 resin injection area
150 light diffusion member
247 gate mark
330 light emitting element package
334 holder
LA optical axis of light emitting element
CA central axis of light control emission surface

The invention claimed is:

1. A light flux controlling member formed by injection molding and configured to control light distribution of light emitted from a light emitting element, comprising:
    a light control emission surface configured to control a traveling direction of light emitted from the light emitting element;
    a back face opposite to the light control emission surface;
    a gate remnant formed on a part of the back face so as to be in contact with an outer rim of the back face; and
    a flange positioned between an outer peripheral part of the light control emission surface and an outer peripheral part of the back face and projecting in a radially outward direction,
    wherein the gate remnant is formed on a region including the part of the back face and a part of the side face of the flange adjoining to the part of the back face.

2. The light flux controlling member according to claim 1, wherein the gate remnant is a protrusion.

3. The light flux controlling member according to claim 2, further comprising a leg portion projecting from the back face in a direction opposite to the light control emission surface, wherein
    a height of the gate remnant from the back face in the direction opposite to the light control emission surface is less than a height of the leg portion from the back face in the direction opposite to the light control emission surface.

4. A light emitting apparatus comprising a light emitting element and the light flux controlling member according to claim 1,
    wherein the light flux controlling member is arranged so that a central axis of the light control emission surface coincides with an optical axis of the light emitting element.

5. A surface light source apparatus comprising the light emitting apparatus according to claim 4 and a light diffusion member that transmits light from the light emitting apparatus while diffusing the light.

6. A display apparatus comprising the surface light source apparatus according to claim 5, and an illumination target member to be irradiated with light from the surface light source apparatus.

7. A light flux controlling member formed by injection molding and configured to control light distribution of light emitted from a light emitting element, comprising:
    a light control emission surface configured to control a traveling direction of light emitted from the light emitting element;
    a back face opposite to the light control emission surface; and
    a gate remnant formed on a part of the back face so as to be in contact with an outer rim of the back face,
    wherein the gate remnant is a protrusion, and
    wherein among the faces constituting the gate remnant, a face opposed to a resin injection area on the back face is inclined against the back face.

8. The light flux controlling member according to claim 7, further comprising a leg portion projecting from the back face in a direction opposite to the light control emission surface, wherein
    a height of the gate remnant from the back face in the direction opposite to the light control emission surface is less than a height of the leg portion from the back face in the direction opposite to the light control emission surface.

9. The light flux controlling member according to claim 7, wherein the gate remnant is formed on a region including the part of the back face and a part of the light control emission surface adjoining to the part of the back face.

10. A light emitting apparatus comprising a light emitting element and the light flux controlling member according to claim 7,
    wherein the light flux controlling member is arranged so that a central axis of the light control emission surface coincides with an optical axis of the light emitting element.

11. A surface light source apparatus comprising the light emitting apparatus according to claim 10 and a light diffusion member that transmits light from the light emitting apparatus while diffusing the light.

12. A display apparatus comprising the surface light source apparatus according to claim 11, and an illumination target member to be irradiated with light from the surface light source apparatus.

* * * * *